(12) United States Patent
Narayan et al.

(10) Patent No.: US 7,068,706 B2
(45) Date of Patent: Jun. 27, 2006

(54) SYSTEM AND METHOD FOR ADJUSTING PHASE

(75) Inventors: Anand P. Narayan, Boulder, CO (US); Prashant Jain, Northglenn, CO (US); Eric S. Olson, Boulder, CO (US)

(73) Assignee: TensorComm, Inc., Westminster, CO (US)

( * ) Notice: Subject to any disclaimer, the term of this patent is extended or adjusted under 35 U.S.C. 154(b) by 0 days.

(21) Appl. No.: 10/686,359

(22) Filed: Oct. 15, 2003

(65) Prior Publication Data

US 2004/0081229 A1    Apr. 29, 2004

Related U.S. Application Data

(60) Provisional application No. 60/418,188, filed on Oct. 15, 2002, provisional application No. 60/418,187, filed on Oct. 15, 2002.

(51) Int. Cl.
*H04B 1/69* (2006.01)
(52) U.S. Cl. ...................................... 375/147
(58) Field of Classification Search ............... 375/371, 375/373–376, 327, 147, 140, 130, 323, 322, 375/316, 354, 324, 346, 350; 327/329, 309, 327/306, 100; 370/209, 208, 203
See application file for complete search history.

(56) References Cited

FOREIGN PATENT DOCUMENTS

GB    2280575 A  *  2/1995

\* cited by examiner

*Primary Examiner*—Pankaj Kumar
(74) *Attorney, Agent, or Firm*—Steven J. Shattil (57) ABSTRACT

Systems and methods for adjusting phase of a signal are provided. In one embodiment, the system includes a phase compensator configured for adjusting phase of the signal based on filtered and unfiltered representations of a first component of the signal and based on filtered and unfiltered representations of a second component of the signal. For example, the phase compensator may provide phase adjusted I and Q components of a complex signal through a plurality of multiplications of filtered and unfiltered I and Q components. The system also includes a detector that is communicatively coupled to the phase compensator. The detector is configured for combining the first and the second components with a code sequence to determine a complex amplitude of a channel.

23 Claims, 6 Drawing Sheets

SYSTEM AND METHOD FOR ADJUSTING PHASE

CROSS REFERENCE TO RELATED APPLICATIONS

This application claims the benefit of an earlier filing date of previously filed U.S. Provisional Patent Application 60/418,188, filed Oct. 15, 2002, and U.S. Provisional Patent Application No. 60/418,187, filed Oct. 15, 2002. Each of the above disclosures is hereby incorporated by reference.

BACKGROUND OF THE INVENTION

1. Field of the Invention

This invention generally relates to communication systems. More specifically, the invention relates to scaling and rotating a complex symbol by a complex gain extracted from another complex symbol. The complex gain may be extracted from a pilot signal, complex conjugated, and then applied to the output of a filter matched to a complex traffic channel signal. Embodiments of the invention may be configured to process a spread spectrum signal, such as a Code Division Multiple Access ("CDMA") signal or a Wideband CDMA signal ("WCDMA").

2. Discussion of Related Art

Communication systems, such as spread spectrum CDMA systems used in the cellular telephony industry, use a variety of modulation schemes. Examples of such modulations include Quadrature Amplitude Modulation (QAM), Quadrature Phase Shift Keying ("QPSK") and Bi Phase Shift Keying ("BPSK"). Those skilled in the art readily understand QPSK and BPSK modulation schemes. These spread spectrum systems transmit signals that convey digital data spread across a band of the radio frequency ("RF") spectrum. For example, transmitted CDMA signals convey digital data that is interspersed or "spread" with pseudo random ("PN") codes at a data rate that is typically much greater than the underlying data rate. As such, the underlying data is spread over a larger spectrum than it otherwise would be.

As used in the cellular telephony industry, a base station will transmit a CDMA signal to a subscriber unit, such as a cell phone. Such signals may be represented using polar or Cartesian representations. Thus, the complex gain of a signal or symbol may be described in terms of complex gain and phase rotation, or in terms of a linear transformation on the in-phase (I) and quadrature-phase (Q) components of the signal or symbol. For example, the complex conjugate of a complex gain $G=|G|e^{i\Phi}=G_I+iG_Q$ may be applied to a complex symbol $X=|X|e^{i\theta}=X_I+iX_Q$ to produce the symbol $Y=|Y|e^{i\Psi}=Y_I+iY_Q$, where $\Psi=\theta-\phi$. The resulting product may be expressed by $$Y=G^*X=|Y|e^{i\Psi}=|G||X|e^{i\Psi}$$

$$Y=Y_I+iY_Q=|G|X_I\cos\phi+|G|X_Q\sin\phi+i(|G|X_Q\cos\phi-|G|X_I\sin\phi).$$

The CDMA signal may be a complex signal comprising I and Q components. Digital data may be transmitted through either or both of these I and Q components. The data is despread at the receiving subscriber unit by combining the I and Q with the same PN code used to spread the data. The subscriber unit thereby extracts the data and converts it to a desired format, such as voice. In the cellular telephony example, extraction of the data may include combining the data with an orthogonal code sequence, such as a Walsh Code sequence. For example, the underlying data may include a plurality of channels. As used herein, a channel refers to an encoded bit spread by an orthogonal code, such as the Walsh code. The same orthogonal code used to encode the data at the transmitter side is subsequently used to extract the data at the receiver side.

The transmitter may send a reference signal known as a pilot signal. This pilot signal is typically used as a phase reference for the received data. For example, the pilot signal may be used to adjust or rotate the phase of the QPSK signal to a predetermined phase quadrant so that the underlying data may be correctly recovered. Since the pilot signal typically conveys no data and uses a zero sequence for encoding, the pilot signal should lie in a single predetermined phase quadrant. Accordingly, if the pilot signal is detected in an incorrect phase quadrant, the pilot signal, and thus the underlying data, can be rotated in phase to the correct phase quadrant.

A simple representation of $Y=Y_I+iY_Q$ is $$\begin{bmatrix} Y_I \\ Y_Q \end{bmatrix} = |G| \begin{bmatrix} \cos\phi & \sin\phi \\ -\sin\phi & \cos\phi \end{bmatrix} \begin{bmatrix} X_I \\ X_Q \end{bmatrix}$$

Typically, the angle $\phi$ is referenced to the angle zero, and the rotation by $-\phi$ is used to rotate X toward the real axis. Thus, the real and imaginary parts of Y, expressed by $$Y_I=|G||X|\cos(\theta-\phi)=|G|X_I\cos\phi+|G|X_Q\sin\phi=G_IX_I+G_QX_Q$$

$$Y_Q=|G||X|\sin(\theta-\phi)=|G|X_Q\cos\phi-|G|X_I\sin\phi=G_IX_Q-G_QX_I$$

may be used for detection in coherent communications. If the transmitted symbols are real (such as may occur in a pilot transmission), then only the real part may be used.

Techniques for rotating the phase, also referred to as carrier phase recovery, exist in the art. However, such techniques operate at a symbol level, as they are used for data recovery of a single channel within the underlying data. For example, one prior-art system combines a Walsh code sequence with each of the I and Q components of a signal immediately after those components are despread. This system is efficient in determining the complex amplitude of a channel selected for data recovery. However, to determine the complex amplitude of multiple channels, a plurality of Walsh codes is needed. The additional Walsh codes contribute to the complexity of the system because more components (e.g., filters, accumulators and multipliers) are needed. Additionally, since each channel requires a multiplication of the Walsh code to the I and Q components, more processing power is consumed due to the extraction of multiple channels. Examples of a system used to rotate phase and thereby extract data of a single channel are illustrated in U.S. Pat. No. 5,506,865 (issued Apr. 9, 1996; the "'865 patent") and U.S. Pat. No. 6,396,804 (issued May 28, 2002; the "'804 patent").

While prior-art systems are particularly useful in extracting data of a single channel, they offer substantially no interference-cancellation capabilities. Interference cancellation can be useful in spread-spectrum systems, such as the CDMA systems of cellular telephony described above, to reduce interference from other sources. Examples of such interfering sources include leakage of energy from other channels that degrade the quality of the selected channel. Leakage may result from calculation errors in down conversion and/or demodulation of a received signal. Accordingly, interference-cancellation receivers can be used to assist in the isolation and extraction of individual channels within spread spectrum signals. Prior examples of interference-cancellation receivers include U.S. Pat. No. 5,930,229 (issued Jul. 27, 1999) and U.S. Pat. No. 5,872,776 (issued Feb. 16, 1999); these examples may provide useful background information.

The phase rotation of some prior-art systems is particularly inefficient for interference cancellation purposes because of the multiple code sequences necessary for extracting data from each channel within a given signal. For example, in isolating an intended channel, each of the unintended channels is considered as a potential interferer with the intended channel; therefore, the unintended channels must be identified so that any potential interference can be countered and the data may be correctly extracted from the intended channel. Since each channel requires its own code sequence for data extraction, a receiver's complexity is inherently increased through the addition of various components necessary for the data extraction.

SUMMARY OF THE INVENTION

An embodiment of the present invention includes a system that can rotate or adjust the phase of a signal. In one embodiment, a system includes a phase compensator configured for adjusting phase of the signal based on filtered and unfiltered representations of a first component of the signal and based on filtered and unfiltered representations of a second component of the signal. For example, the phase compensator may provide phase adjusted I and Q components of a QPSK signal through a plurality of vector multiplications of filtered and unfiltered I and Q components. The system also includes a detector that is communicatively coupled to one or more outputs of the phase compensator and configured for combining the first and the second components with a code sequence to determine a complex amplitude of a channel.

In one embodiment of the invention, a system, comprises a phase compensator configured for adjusting phase of a signal based on filtered and unfiltered representations of a first component of the signal and based on filtered and unfiltered representations of a second component of the signal; and a detector communicatively coupled to one or more outputs of the phase compensator and configured for combining the first and the second components with a code sequence to determine a complex amplitude of a channel.

In one aspect of this embodiment, the first component is an in-phase component $Y_I$ expressed by:

$Y_I = |G|X_I \cos \phi + |G|X_Q \sin \phi$, where $X_I$ is an unfiltered representation of the in-phase component, $|G| \cos \phi$ is the filtered representation of the in-phase component, $X_Q$ is an unfiltered representation of the quadrature component and $|G| \sin \phi$ is the filtered representation of the quadrature component. In another aspect of this embodiment, the second component is a quadrature component $Y_Q$ expressed by:

$Y_Q = |G|X_Q \cos \phi - |G|X_I \sin \phi$, where $X_I$ is the unfiltered representation of the in-phase component, $|G| \cos \phi$ is the filtered representation of the in-phase component, $X_Q$ is an unfiltered representation of the quadrature component and $|G| \sin \phi$ is the filtered representation of the quadrature component.

In another embodiment, the code sequence is a Walsh code sequence.

In another embodiment, the detector comprises one or more code sequence generators each configured for generating a unique code sequence.

In another embodiment, the detector further comprises a first multiplier communicatively coupled to the code sequence generators and configured for combining the first component with one or more of the code sequences to generate a combined first component; and a second multiplier communicatively coupled to the code sequence generators and configured for combining the second component with one or more of the code sequences to generate a combined second component.

In another embodiment, the detector further comprises an accumulator communicatively coupled to the first and the second multipliers for summing the combined first component over a symbol duration to generate a first symbol level data and for summing the combined second component over a symbol duration to generate a second symbol level data.

In another embodiment, the detector comprises a fast Walsh transform element configured for combining the first and the second components with a plurality of Walsh code sequences to determine complex amplitudes of one or more unique channels.

In one embodiment of the invention, a method of adjusting phase of a signal comprises generating a phase adjusted first component of the signal by multiplying an unfiltered first component of the signal with a filtered first component of the signal to provide a first product, multiplying an unfiltered second component of the signal with a filtered second component of the signal to provide a second product, and combining the first and the second products in response to multiplying to generate the phase adjusted first component; and generating a phase adjusted second component of the signal by multiplying the unfiltered second component with the filtered first component to provide a third product, multiplying the unfiltered first component with the filtered second component to provide a fourth product, and combining the third and the fourth products in response to multiplying to generate the phase adjusted second component, wherein generating the phase adjusted first component and generating the phase adjusted second component adjusts the phase of the signal.

In another embodiment, combining the first and the second products comprises adding the first product to the second product.

In another embodiment, combining the third and the fourth products comprises subtracting the fourth product from the third product.

In another embodiment, generating the phase adjusted first component, comprises latching the first product and the second product to a summation element at substantially the same time.

In another embodiment, generating the phase adjusted second component, comprises latching the third product and the fourth product to a subtractive element at substantially the same time.

In one embodiment of the invention, a method for processing a signal comprises adjusting phase of a first component of the signal through a plurality of multiplications, operands of which include filtered and unfiltered representations of the first component and which include filtered and unfiltered representations of a second component of the signal, to generate a phase adjusted first component; adjusting phase of the second component through a plurality of multiplications, operands of which include the filtered and the unfiltered representations of the first component and which include the filtered and the unfiltered representations of the second component, to generate a phase adjusted second component; combining the phase adjusted first component and the phase adjusted second component with a code sequence to determine a complex amplitude of a channel.

In one embodiment of the invention, a system comprises a despreader configured for despreading first and second components of a signal; a filter bank communicatively coupled to the despreader and configured for filtering the first and the second components of the signal to generate a filtered representation of the first component and a filtered representation of the second component; and a phase compensator coupled to the despreader and to the filter bank and configured for adjusting phase of the signal based on the filtered representations of the first and the second components and based on unfiltered representations of the first and the second components.

DETAILED DESCRIPTION OF THE DRAWINGS

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the spirit and scope of the invention as defined by the claims.

Figure 1:
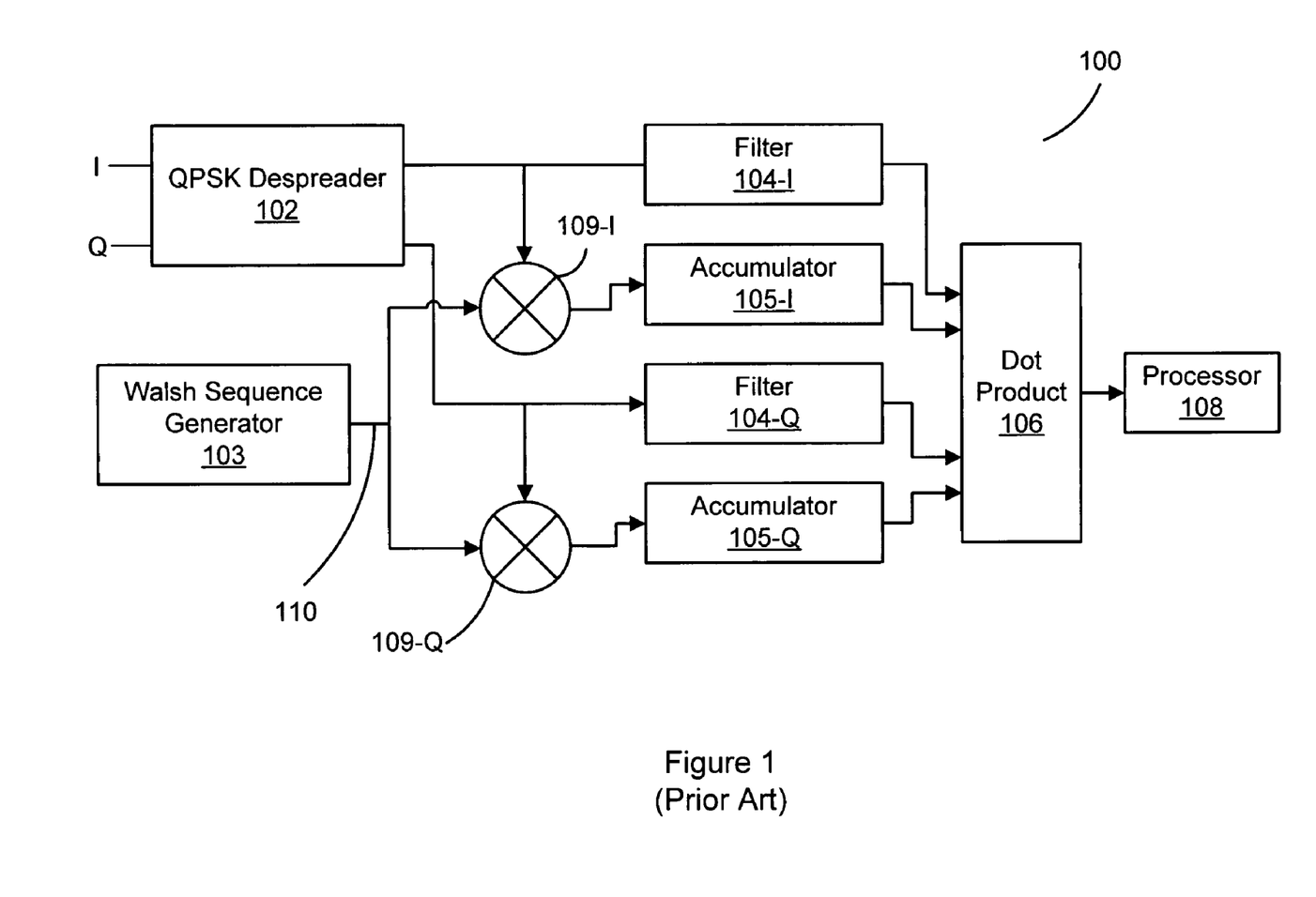
FIG. 1 illustrates a block diagram of a prior-art system.

FIG. 1 illustrates a block diagram of prior-art system 100. System 100 is a spread spectrum receiver that extracts data from received I and Q data streams of a QPSK signal. System 100 includes a QPSK despreader 102 that despreads the I and Q data streams using PN codes. The resultant despread I and Q data streams are provided to filters 104-I and 104-Q, respectively. Filters 104-I and 104-Q respectively filter the I and Q data streams. The filtered outputs of filters 104-I and 104-Q are subsequently used as references for the carrier phase of the signal.

The resultant I and Q data streams are also provided to logical multipliers 109-I and 109-Q, respectively. Multipliers 109-I and 109-Q perform a modulo 2 sum addition on the despread I and Q data streams, respectively, with a Walsh code 110. Accordingly, Walsh sequence generator 103 provides the Walsh code 110 to both multipliers 109-I and 109-Q. Multipliers 109-I and 109-Q thereby provide modulo 2 summed I and Q data streams to accumulators 105-I and 105-Q, respectively. Such logical math is well known to those skilled in the art. Accumulators 105-I and 105-Q accumulate a predetermined number of bits subsequently encoded and provided by multipliers 109-I and 109-Q, respectively. Accumulators are also known to those skilled in the art. The unfiltered I and Q data streams output from accumulators 105-I and 105-Q represent channel data.

Each of filters 104-I and 104-Q and accumulators 105-I and 105-Q transfer their respective data streams to dot product module 106. The dot product is also called the scalar product or inner product. The dot product module 106 generates a rotated data sample subsequently used by processor 108, as described in the '865 patent. For example, dot product module 106 generates the dot product between a pilot signal vector and a data signal vector in the I–Q coordinate space. The dot product conforms to the equation:

$$G^*X = |G||X|e^{j(\theta-\phi)}, \text{ where} \qquad \text{(Eq. 1)}$$

G is the pilot signal vector, X is the data signal vector and $(\theta-\phi)$ is the angle between the two vectors. This equation is expressible in a vector component form as:

$$(G^*X)_I = G_I X_I + G_Q X_Q \text{ and } (G^*X)_Q = G_I X_Q - G_Q X_I, \text{where} \qquad \text{(Eq. 2)}$$

the I and Q subscripts represent I and Q components. These equations relate to the rotation of phase on a symbol level basis of the QPSK signal. For example, phase rotation is performed on a symbol of the signal wherein each symbol represents multiple bits, such as two bit per symbol in a QPSK signal.

While useful in extracting data of a single channel, as described in the '865 patent, system 100 increases in complexity when multiple channels are to be extracted.

Although not specifically used for interference cancellation, the '865 patent, system 100 is inefficient in such applications primarily because multiple channels are detected. For example, Walsh code 110 is specifically chosen for a particular channel. To detect more channels, additional Walsh codes must be implemented. This addition of Walsh codes increases the number of filters, accumulators and multipliers in the system because the Walsh codes are applied prior to rotation of phase. These multiple channels may even exceed the number of chips per symbol. The number of bits used to represent the outputs of these channels may exceed the number of bits used to represent the raw IQ data from which the complex signals G and X are computed.

Figure 2:
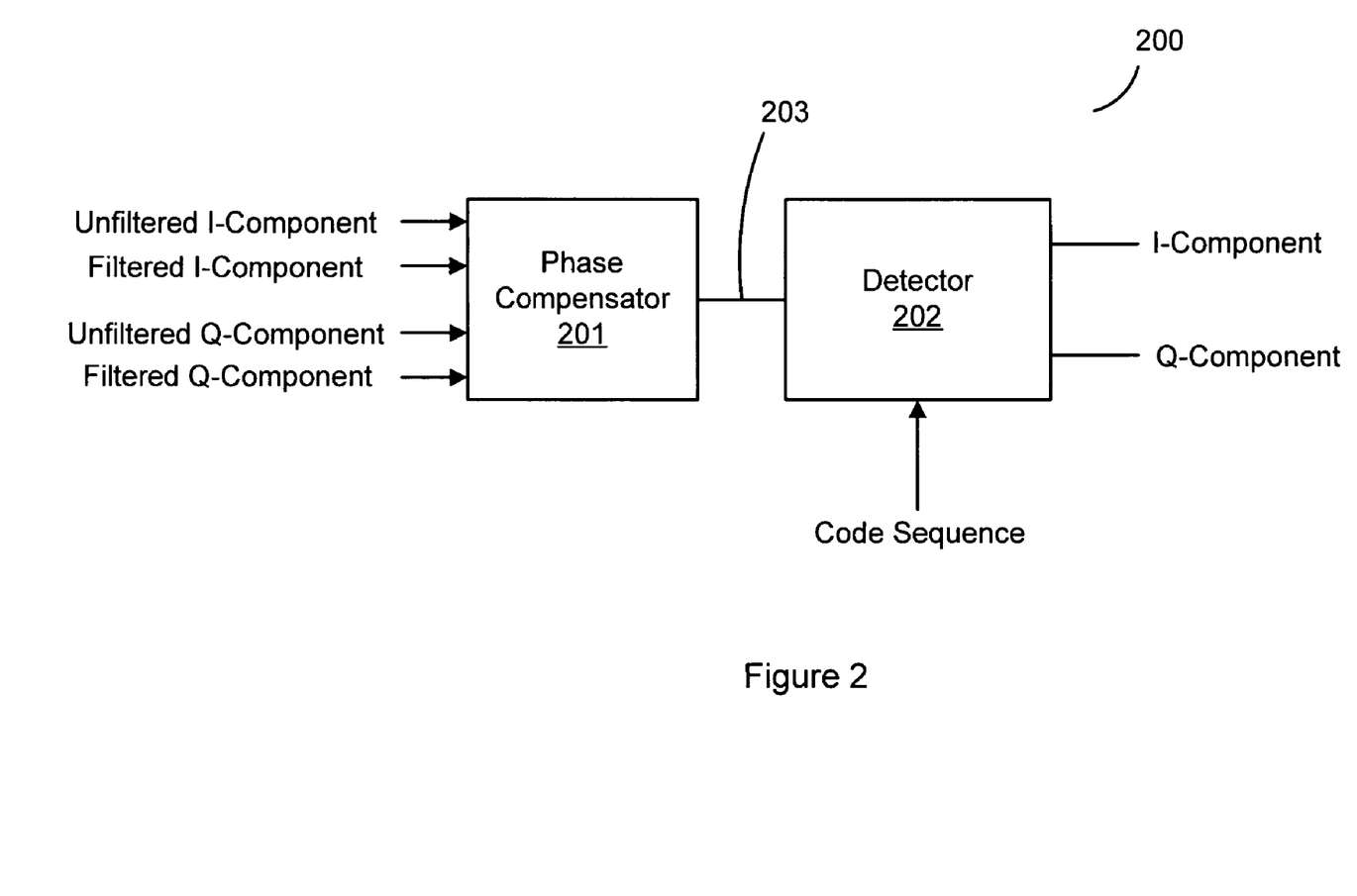
FIG. 2 illustrates a block diagram of a system in one embodiment of the invention.

FIG. 2 illustrates a block diagram of system 200 in one embodiment of the invention. System 200 comprises phase compensator 201 configured for adjusting phase of a signal based on filtered and unfiltered representations of an I component of a complex signal and based on filtered and unfiltered representations of a Q component of the signal. For example, phase compensator 201 receives both a filtered and an unfiltered representation of the I component. Phase compensator 201 also receives both a filtered and an unfiltered representation of the Q component. These I and Q components may be resultant data streams of QPSK despreading. Phase compensator 201 may multiply various combinations of these inputs to adjust the phase of the I and Q components. In adjusting the phase, phase compensator 201 may determine an amount of angular offset in the phase based on the products of these multiplications. As such, phase compensator 201 may compensate the signal such that unintentional phase rotations can be accounted for. Such a compensation may equate to a rotation of the phase to a desired quadrant. Since phase adjustment may be performed subsequent to despreading (e.g., without the combination of Walsh codes as seen in FIG. 1), phase adjustment is performed on a chip level basis, wherein a chip is a fundamental unit of an information-bearing symbol and well known to those skilled in the art.

A filtered chip-rate signal x=[x[0], . . . ,x[N−1]] may be matched with a Walsh matrix or a similar matrix of matched filters W=[w₀, . . . , $w_{M-1}$] to produce a symbol vector b, expressed by $$b = W^*x,$$

where N is the Walsh code length and M is the number of matched filters. The $m^{th}$ element of the symbol vector b is $$b_m = w_m^* x.$$

The symbol vector b is scaled and rotated by the complex conjugate of the complex gain G, where G is the value $b_0 = w_0^* x$, which is the output of the pilot channel. The Walsh code vector $w_0$ is a vector of ones. G may be expressed by $$G = b_0 = \sum_{n=0}^{N-1} x[n].$$

The scaling and rotation of the symbol vector b is now $$\tilde{b} = G^* W^* x = W^* G^* x.$$

The complex scalar gain G* which is extracted from the pilot channel, may be applied to each element of the symbol vector b following demodulation with the matrix of matched filters. Alternatively, G* may be applied to the signal x prior to matched filtering. When the chip-rate signal x has dimension N<M, or when the bit-width of x is smaller than the bit width of b, then the application of G* to x may be preferred to the application of G* to b.

The inner products may be written as the convolution $$b_m[t] = \sum_{n=0}^{N-1} w_m^*[t-[N-1-n]]x[n] = w_m^*[N-1-n] * x[n]$$

sampled at t=N−1, wherein the terms $w_m^*$[N−1−n] are coefficients of the filter $w_m$=[$w_m$[0], . . . , $w_m$[N−1]] after complex conjugation and time reversal.

Additionally, system 200 comprises detector 202 communicatively coupled to phase compensator 201 through link 203. For example, link 203 may represent one or more outputs of phase compensator 201 that transfers phase adjusted I and Q outputs to detector 202. Detector 202 is configured for combining the I and Q components with one or more code sequences to determine a complex amplitude of one or more channels. For example, detector 202 may combine phase adjusted I and Q components from phase compensator 201 with a Walsh code sequence. Accordingly, detector 202 may provide I and Q components that are phase adjusted (e.g., rotated) and encoded with a code sequence that allows complex amplitudes of other channels within the signal to be determined through additional processing.

Although useful in data extraction, system 200 may also be useful in interference-cancellation systems. For example, complex amplitudes of multiple channels may be determined through the addition of multiple code sequences. Contrary to the prior-art system 100 of FIG. 1, multiple code sequences may be added to system 200 without substantially increasing the complexity of the system. In this embodiment, the combination of code sequences with the phase adjusted I and Q components is performed after phase adjustment occurs. Consequently, there are fewer multiplications to be performed by phase compensator 201 as the I and Q data streams.

Figure 3:
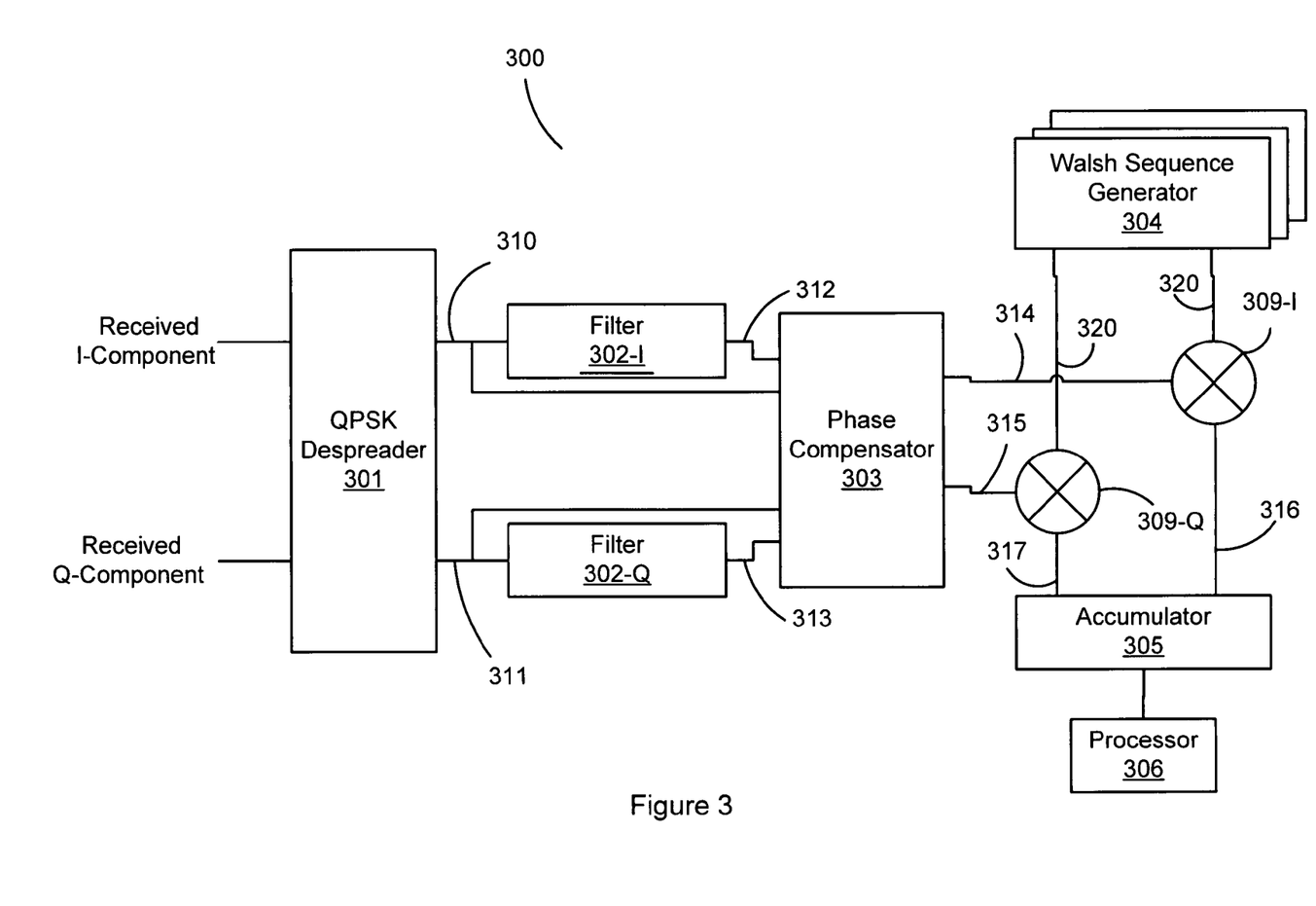
FIG. 3 illustrates a block diagram of a system in another embodiment of the invention.

FIG. 3 illustrates a block diagram of system 300 in another embodiment of the invention. In this embodiment, system 300 may advantageously require use in a spread spectrum receiver that uses a chip-wise multiply for resolving I and Q components of underlying data.

System 300 includes QPSK despreader 301. Despreader 301 receives I and Q component data streams and subsequently despreads these I and Q streams. After despreading, despreader 301 transfers the data streams to phase compensator 303 both directly and through filters 302-I and 302-Q. For example, despreader 301 is communicatively coupled to filters 302-I and 302-Q. Filters 302-I and 302-Q are configured to respectively filter the despread I component 310 and Q component 311 and provide filtered representations of the despread I (312) and Q (313) components. These filtered representations may substantially conform to the following equations:

$Y_I=|G|X_I \cos \phi+|G|X_Q \sin \phi$, where $|G| \cos \phi$ is the filtered I component, and (Eq. 3)

$Y_Q=|G|X_Q \cos \phi-|G|X_I \sin \phi$ where $|G| \sin \phi$ is the filtered Q component. (Eq. 4)

Typically, the coefficient |G| refers to a complex scale factor representing the complex gain of the reference signal (i.e., the pilot signal). In an embodiment where a Phase Lock Loop ("PLL") or a unit scaled phase reference is used, then |G| may be considered as unity. The angle φ may be considered as a residual carrier phase that represents an angle of deviation (e.g., unintended rotation of the phase) from transmitted values. For example, due to calculation errors such as those produced in down conversion and/or demodulation, energy levels from other channels within the signal may "leak" and cause angular deviation. This angular deviation, therefore, may represent a change from expected energy levels of the channels. Filters 302-I and 302-Q may be digital filters that digitally filter samples of the I and Q data streams on a sample-by-sample basis.

Phase compensator 303 produces phase adjusted I and Q data streams 314 and 315, respectively. Phase compensator 303 then transfers the phase adjusted I and Q data streams 314 and 315 to multipliers 309-I and 309-Q, respectively. Multipliers 309-I and 309-Q subsequently combine the I and Q data streams 314 and 315 with one or more Walsh codes as generated by Walsh sequence generator 304. For example, a plurality of Walsh codes may be communicatively coupled to multipliers 309-I and 309-Q such that a plurality of channels may be isolated and/or extracted.

Once combined, multipliers 309-I and 309-Q transfer the combined I and Q components 316 and 317, respectively, to accumulator 305. Accumulator 305 correspondingly accumulates, or sums, the combined components 316 and 317 over a symbol duration to generate symbol level data. This symbol level data is ultimately processed by processor 306, which may in turn determine complex amplitudes of various channels within the signal and/or phase offsets within the signal.

Figure 4:
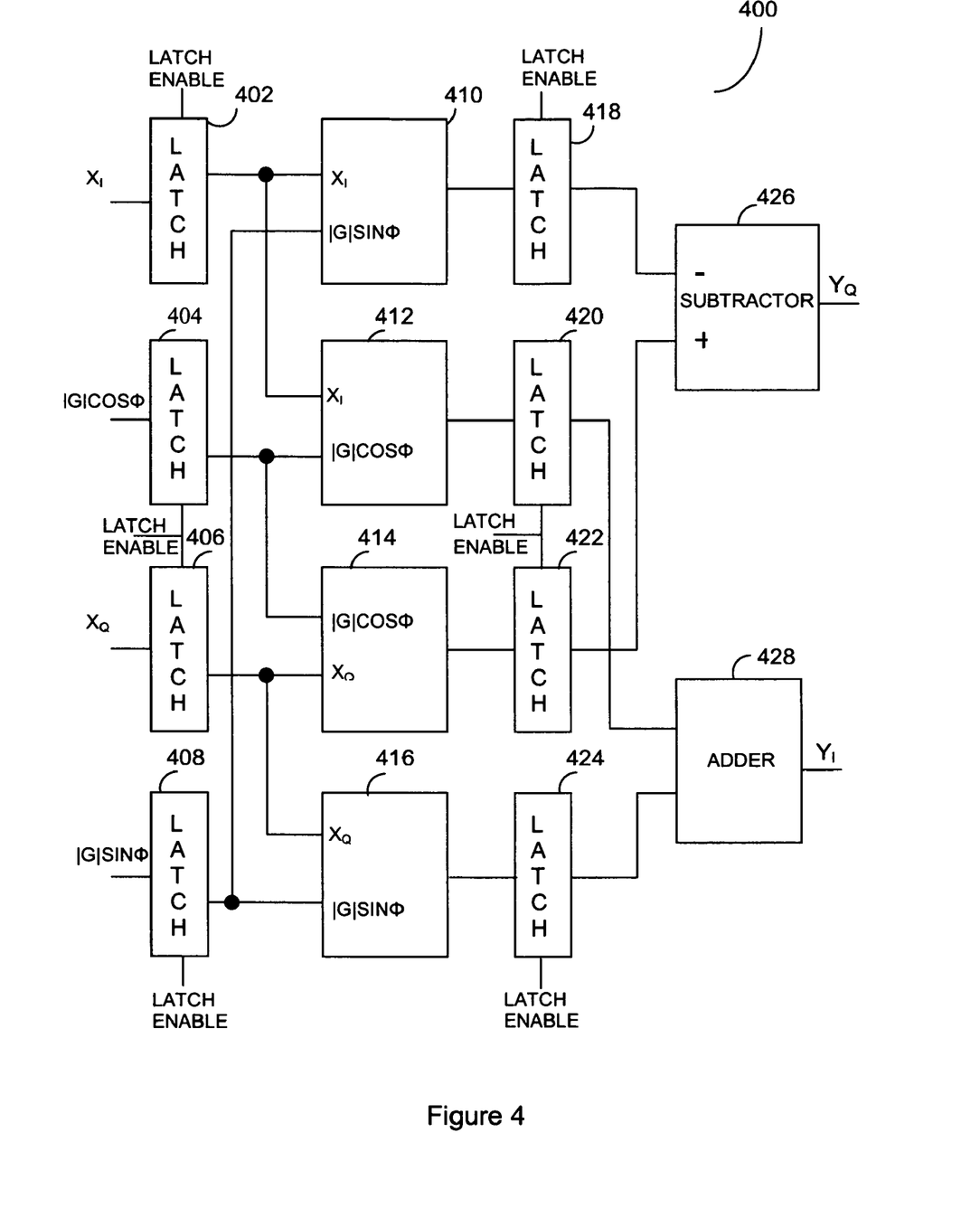
FIG. 4 illustrates a block diagram of a phase compensator in one embodiment of the invention.

FIG. 4 illustrates a block diagram of a phase compensator 400 in one embodiment of the invention. Phase compensator 400 may be used to adjust the phase of a signal in a manner that is similar to that of phase compensator 303 of FIG. 3. In this exemplary embodiment, a plurality of latches 402 . . . 408 are used to latch filtered and unfiltered representations of the I and Q data streams at substantially the same time as each latch receives the same latch enable signal LATCH ENABLE.

The I and Q data streams are latched to multipliers 410...416 to generate various products of the input signals. For example, multiplier 410 generates a product of |G|X$_I$ sin φ, multiplier 412 generates a product of |G|X$_I$ cos φ, multiplier 414 generates a product of |G|X$_Q$ cos φ, and multiplier 416 generates a product of |G|⊕X$_Q$ sin φ. These four products are then latched to subtractor 426 and adder 428 via latches 418...424. Subtractor 426 and adder 428 combine the products to yield the phase-adjusted I and Q components, Y$_I$ and Y$_Q$, respectively, conforming to the following equations:

$$Y_I = |G|X_I \cos \phi + |G|X_Q \sin \phi \text{ and} \quad \text{(Eq. 5)}$$

$$Y_Q = |G|X_Q \cos \phi - |G|X_I \sin \phi. \quad \text{(Eq. 6)}$$

These phase-adjusted I and Q components represent the I and Q components 314 and 315 produced by phase adjuster 303 of FIG. 3. As such, these phase adjusted I and Q components have no PN codes or residual carrier phase. These I and Q components are typically used in amplitude determinations of channels. Such determinations may be performed by a processor, such as processor 306 of FIG. 3.

While represented as a plurality of multipliers, latches, subtractors and adders, those skilled in the art should readily recognize that other combinations of elements may be used that fall within the scope of the invention. For example, a single multiplier may be used instead of four. Consequently, the inputs to such a multiplier may be multiplexed.

Figure 5:
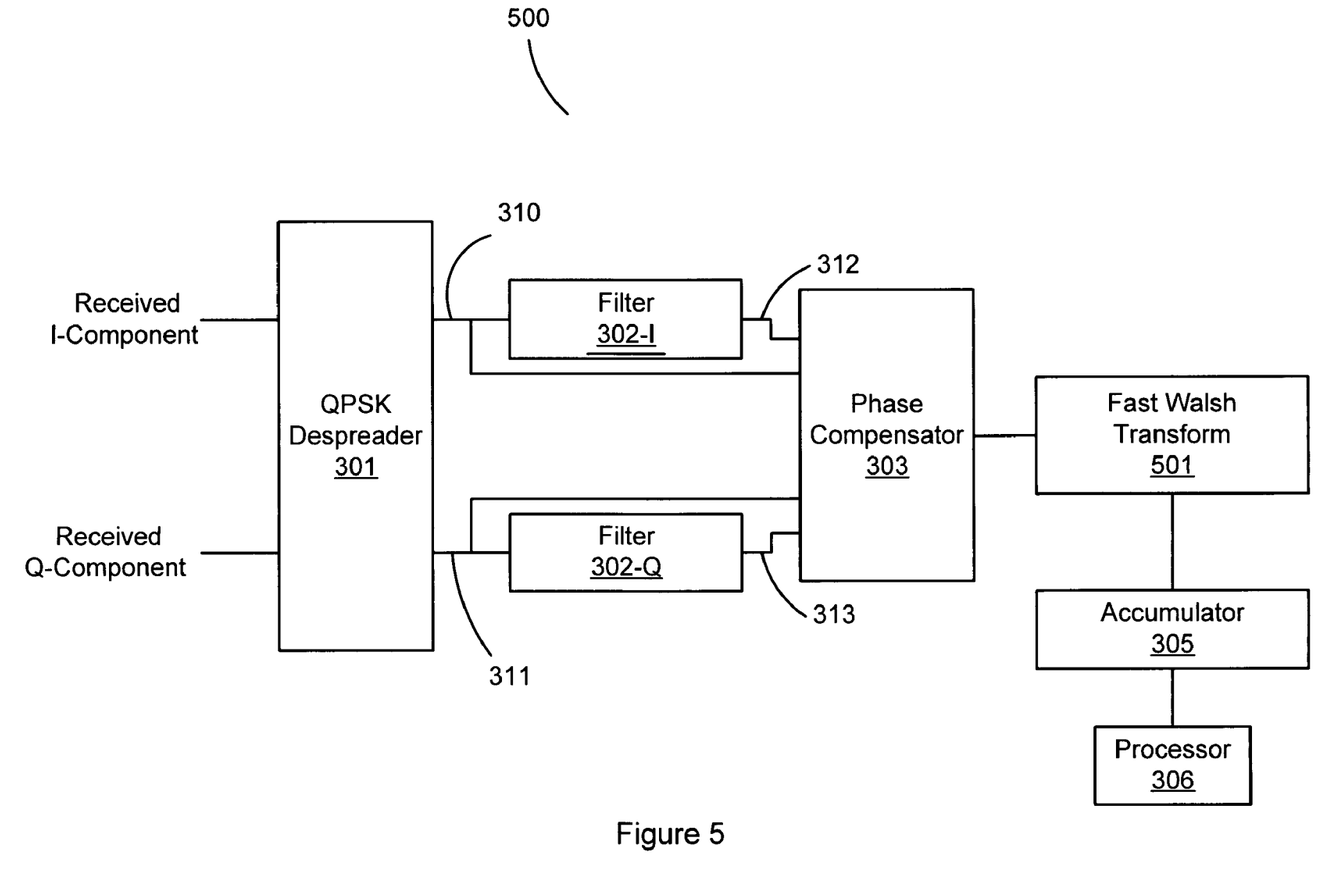
FIG. 5 illustrates a block diagram of a system in another embodiment of the invention.

FIG. 5 illustrates a block diagram of system 500 in another embodiment of the invention. In this embodiment, system 500 replaces the multipliers 309-I and 309-Q and Walsh sequence generator 304, each of FIG. 3, with a Fast Walsh Transform 501. Phase adjustment is still performed by the phase compensator 303 as was performed in FIG. 3. However, in this embodiment, Fast Walsh Transform 501 is capable of incorporating a plurality of Walsh codes thereby expediting the multiplication process previously performed by the multipliers 309-I and 309-Q through a matrices calculations. The use of such a Walsh transform 501 is disclosed in U.S. Provisional Patent Application No. 60/418,187 (filed Oct. 15, 2002), which was incorporated by reference.

Figure 6:
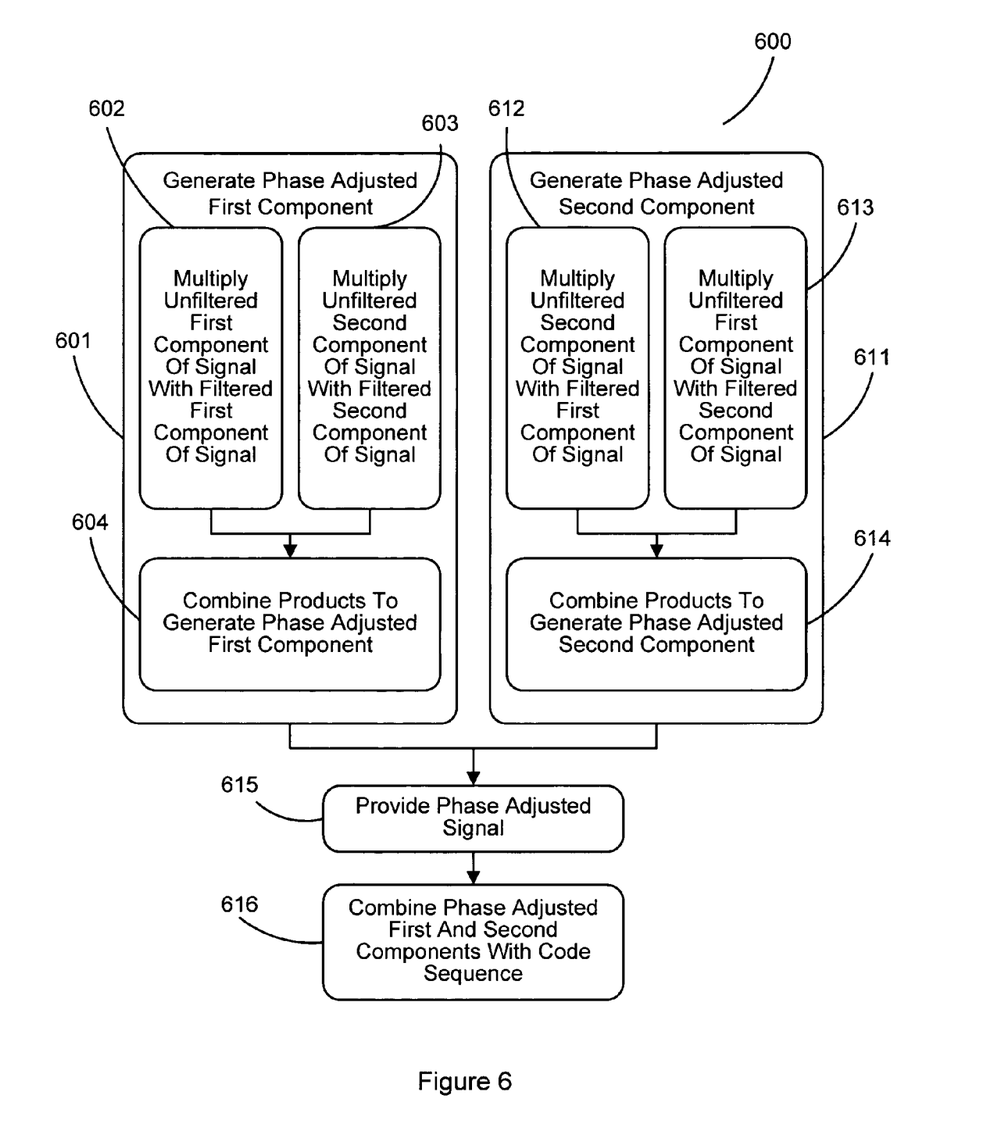
FIG. 6 illustrates a flow chart of one example of a methodical embodiment of the invention.

FIG. 6 illustrates a flow chart of one example of a methodical embodiment 600 of the invention. In this embodiment, phase of a signal adjusted using various products of first and second components of the signal, such as I and Q components of a QPSK signal. Each component is phase adjusted in elements 601 and 611. Each of elements 601 and 611 comprises additional features to provide such phase adjusted components. In generating the phase adjusted first component (i.e., element 601), an unfiltered first component of the signal is multiplied with a filtered first component of the signal, in element 602. Additionally, an unfiltered second component of the signal is multiplied with a filtered second component of the signal, in element 603. The products of element 602 and 603 are then combined to generate a phase adjusted first component, in element 604. Such a combination may include adding the products to produce a component such as that shown in Eq. 5 of FIG. 4.

Similarly, in element 611, the unfiltered second component of the signal is multiplied with the filtered first component, in element 612, and, in element 613, the unfiltered first component of the signal is multiplied with the filtered second component. These two products are then combined in element 614 to generate a phase adjusted second component. The two phase adjusted components provided in elements 604 and 614 result in a phase adjusted signal. For example, with the first component representing an I component in the QPSK signal and the second component representing an I component of the QPSK signal, the phase adjusted I and Q components thereby provide a phase determinable signal such that an underlying pilot signal may be phase adjusted to a desired quadrant.

In one embodiment, the method includes an element in which the phase adjusted I and Q components are combined with one or more code sequences. Such code sequences may include Walsh codes that are used to detect one or more channels within the signal. Such channel detection may advantageously require use within a CDMA cellular telephony system, particularly in a subscriber unit such as cell phone.

In a preferred embodiment, the elements of multiplying are performed synchronously. However, the invention is not intended to be limited to the order in which multiplying occurs. For example, multiplying may be performed in a time-multiplexed fashion in which products are stored until multiplying is complete. Furthermore, in the preferred embodiment, multiplying is performed on a sample-by-sample basis. However, other embodiments may include registering a predetermined length of data such that different sections of the first and second components may be phase adjusted at the same time.

The above embodiments are not intended to be limited to CDMA2000 or other CDMA systems as they may be employed in any system using PSK. For example, the above embodiments may be used in PSK applications such as channel estimation for interference cancellation, data testing for determining the presence of multiple Walsh codes, and/or simultaneously demodulating data of multiple channels.

It should be noted that the above embodiments of the invention may be implemented in a variety of ways. For example, the above embodiments may be implemented from software, firmware, hardware or any combination thereof. Those skilled in the art are familiar with software, firmware, hardware and their various combinations. Accordingly, those skilled in the art should readily recognize that such implementations are a matter of design choice and should not be limited to any particular implementation.

While the invention has been illustrated and described in detail in the drawings and foregoing description, such illustration and description is to be considered as exemplary and not restrictive in character. Accordingly, it should be understood that only the preferred embodiment and minor variants thereof have been shown and described and that all changes and modifications that come within the spirit of the invention are desired to be protected.

What is claimed is:

1. A system, comprising:
   a phase compensator configured for adjusting phase of a signal based on filtered and unfiltered representations of a first component of the signal and based on filtered and unfiltered representations of a second component of the signal; and
   a detector communicatively coupled to one or more outputs of the phase compensator and configured for combining the first and the second components with at least one code sequence to determine a complex amplitude of a channel, wherein the detector further comprises:

at least one code sequence generator configured for generating the at least one code sequence that is unique a first multiplier communicatively coupled to the code sequence generators and configured for combining the first component with one or more of the code sequences to generate a combined first component; and a second multiplier communicatively coupled to the code sequence generators and configured for combining the second component with one or more of the code sequences to generate a combined second component.

2. The system of claim 1, wherein the detector further comprises an accumulator communicatively coupled to the first and the second multipliers for summing the combined first component over a symbol duration to generate a first symbol level data and for summing the combined second component over a symbol duration to generate a second symbol level data.

3. The system of claim 1, wherein the first component is an in-phase component substantially conforming to the following:

$Y_I = |G|X_I \cos \phi + |G|X_Q \sin \phi$, where $X_I$ is an unfiltered representation of the in-phase component, $|G| \cos t$ is a filtered representation of the in-phase component, $X_Q$ is an unfiltered representation of a quadrature component, and $|G| \sin \phi$ is a filtered representation of the quadrature component.

4. The system of claim 1, wherein the second component is a quadrature component substantially conforming to the following:

$Y_Q = |G|X_Q \cos \phi - |G|X_I \sin \phi$, where $X_I$ is an unfiltered representation of an in-phase component, $|G| \cos \phi$ is the filtered representation of the in-phase component, $X_Q$ is an unfiltered representation of the quadrature component, and $|G| \sin \phi$ is a filtered representation of the quadrature component.

5. The system of claim 1, wherein the code sequence is a Walsh code sequence.

6. The system of claim 1, wherein the detector comprises a fast Walsh transform element configured for combining the first and the second components with a plurality of Walsh code sequences to determine complex amplitudes of one or more unique channels.

7. A method of adjusting phase of a signal, comprising:

generating a phase adjusted first component of the signal by a first multiplying step an unfiltered first component of the signal with a filtered first component of the signal to provide a first product, a second multiplying step an unfiltered second component of the signal with a filtered second component of the signal to provide a second product, and combining the first and the second products in response to the second multiplying step to generate the phase adjusted first component; and generating a phase adjusted second component of the signal by a third multiplying step the unfiltered second component with the filtered first component to provide a third product, a fourth multiplying step the unfiltered first component with the filtered second component to provide a fourth product, and combining the third and the fourth products in response to the fourth multiplying step to generate the phase adjusted second component, wherein generating the phase adjusted first component and generating the phase adjusted second component adjusts the phase of the signal.

8. The method of claim 7, wherein combining the first and the second products comprises adding the first product to the second product.

9. The method of claim 8, wherein adding comprises providing the phase adjusted second component having substantially the following form:

$Y_I = |G|X_I \cos \phi + |G|X_Q \sin \phi$, where $X_I$ is an unfiltered representation of an in-phase component, $|G| \cos \phi$ is a filtered representation of the in-phase component, $X_Q$ is an unfiltered representation of a quadrature component, and $|G| \sin \phi$ is a filtered representation of the quadrature component.

10. The method of claim 7, wherein combining the third and the fourth products comprises subtracting the fourth product from the third product.

11. The method of claim 10, wherein the subtracting comprises providing the phase adjusted second component having substantially the following form:

$Y_Q = |G|X_Q \cos t \phi \ |G|X_I \sin \phi$, where $X_I$ is a unfiltered representation of an in-phase component, $|G| \cos \phi$ is a filtered representation of the in-phase component, $X_Q$ is an unfiltered representation of a quadrature component and $|G| \sin \phi$ is a filtered representation of the quadrature component.

12. The method of claim 7, wherein generating the phase adjusted first component, comprises:

latching the first product and the second product to a summation element at substantially the same time.

13. The method of claim 7, wherein generating the phase adjusted second component, comprises:

latching the third product and the fourth product to a subtractive element at substantially the same time.

14. A system for adjusting phase of a signal, comprising:

means for generating a phase adjusted first component of the signal comprising first means for multiplying an unfiltered first component of the signal with a filtered first component of the signal to provide a first product, second means for multiplying an unfiltered second component of the signal with a filtered second component of the signal to provide a second product, and means for combining the first and the second products in response to the second multiplying means to generate the phase adjusted first component; and means for generating a phase adjusted second component of the signal comprising third means for multiplying the unfiltered second component with the filtered first component to provide a third product, fourth means for multiplying the unfiltered first component with the filtered second component to provide a fourth product, and means for combining the third and the fourth products in response to the fourth multiplying means to generate the phase adjusted second component, wherein the means for generating the phase adjusted first component and the means for generating the phase adjusted second component are configured to adjust the phase of the signal.

15. The system of claim 14, wherein the means for combining the first and the second products comprises means for adding the first product to the second product.

16. The system of claim 15, wherein the means for adding comprises means for providing the phase adjusted second component having substantially the following form:

$Y_I=|G|X_I \cos \phi + |G|X_Q \sin \phi$, where $X_I$ is an unfiltered representation of an in-phase component, $|G|\cos \phi$ is a filtered representation of the in-phase component, $X_Q$ is an unfiltered representation of a quadrature components and $|G|\sin \phi$ is a filtered representation of the quadrature component.

17. The system of claim 14, wherein the means for combining the third and the fourth products comprises means for subtracting the fourth product from the third product.

18. The system of claim 17, wherein the means for subtracting comprises means for providing the phase adjusted second component having substantially the following form:

$Y_Q=|G|X_Q \cos \phi - |G|X_I \sin \phi$, where $X_I$ is an unfiltered representation of an in-phase component, $|G|\cos \phi$ is a filtered representation of the in-phase component, $X_Q$ is an unfiltered representation of Ha quadrature component and $|G|\sin \phi$ is a filtered representation of the quadrature component.

19. The system of claim 14, wherein the means for generating the phase adjusted first component, comprises:
means for latching the first product and the second product to a summation element at substantially the same time.

20. The system of claim 14, wherein the means for generating the phase adjusted first component, comprises:
means for latching the third product and the fourth product to a subtractive element at substantially the same time.

21. A method for processing a signal, comprising:
adjusting phase of a first component of the signal through a plurality multiplications, operands of which include filtered and unfiltered representations of the first component and which include filtered and unfiltered representations of a second component of the signal, to generate a phase adjusted first component;
adjusting phase of the second component through a plurality multiplications, operands of which include the filtered and the unfiltered representations of the first component and which include the filtered and the unfiltered representations of the second component, to generate a phase adjusted second component;
combining the phase adjusted first component and the phase adjusted second component with a code sequence to determine a complex amplitude of a channel.

22. The method of claim 21, wherein adjusting the phase of the first component comprises adding products generated from the multiplications to generate the phase adjusted first component having substantially the following form:

$Y_I=|G|X_I \cos \phi + |G|X_Q \sin \phi$, where $X_I$ is an unfiltered representation of an in-phase component, $|G|\cos \phi$ is a filtered representation of the in-phase component, $X_Q$ is an unfiltered representation of a quadrature components and $|G|\sin \phi$ is a filtered representation of the quadrature component.

23. The method of claim 21, wherein adjusting the phase of the second component comprises adding products generated from the multiplications to generate the phase adjusted second component having substantially the following form:

$Y_Q=|G|X_Q \cos t \phi - |G|X_I \sin \phi$, where $X_I$ is an unfiltered representation of an in-phase component, $|G|\cos \phi$ is a filtered representation of the in-phase component, $X_Q$ is an unfiltered representation of a quadrature component, and $|G|\sin \phi$ is a filtered representation of the quadrature component.

* * * * *